Patented May 25, 1954

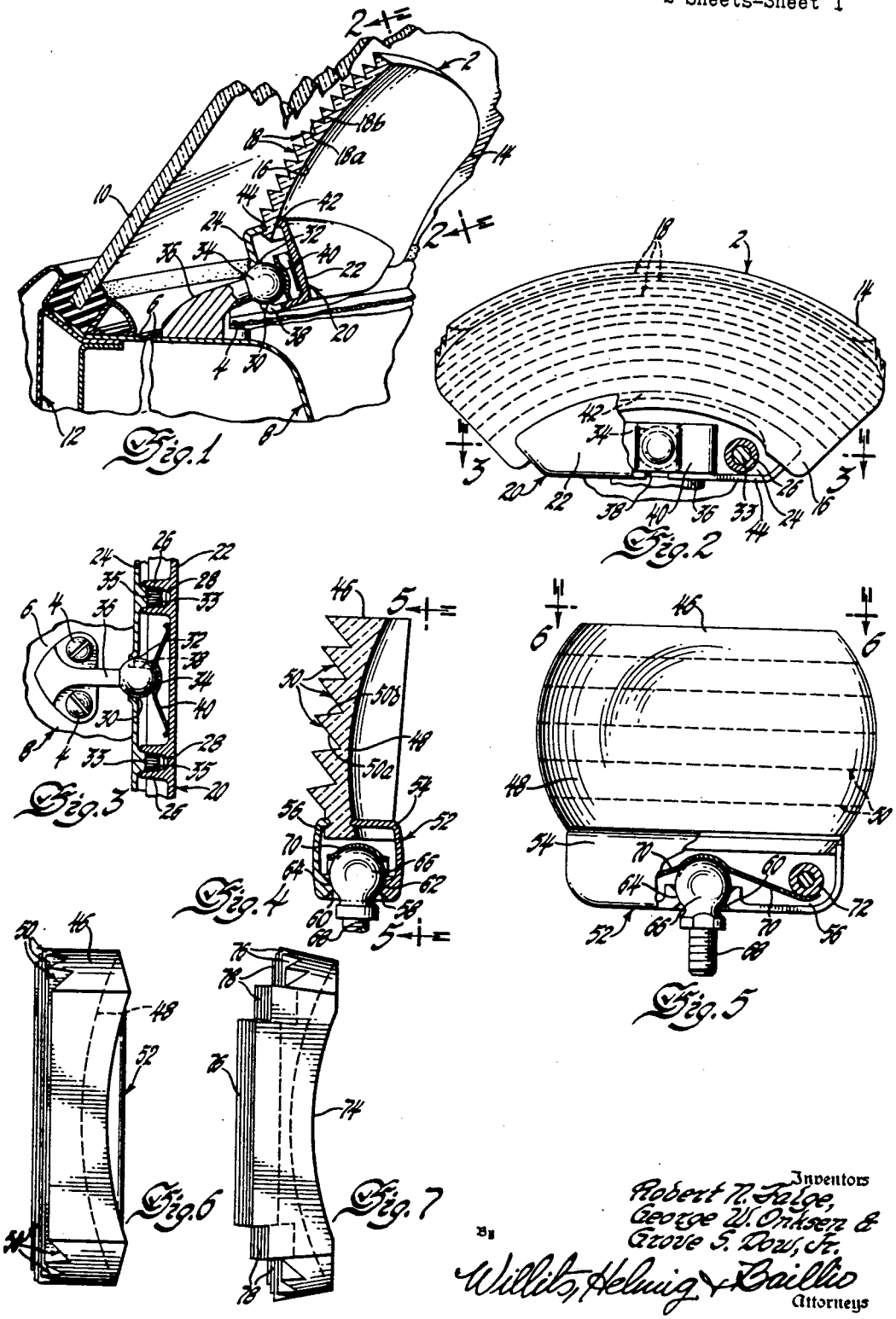

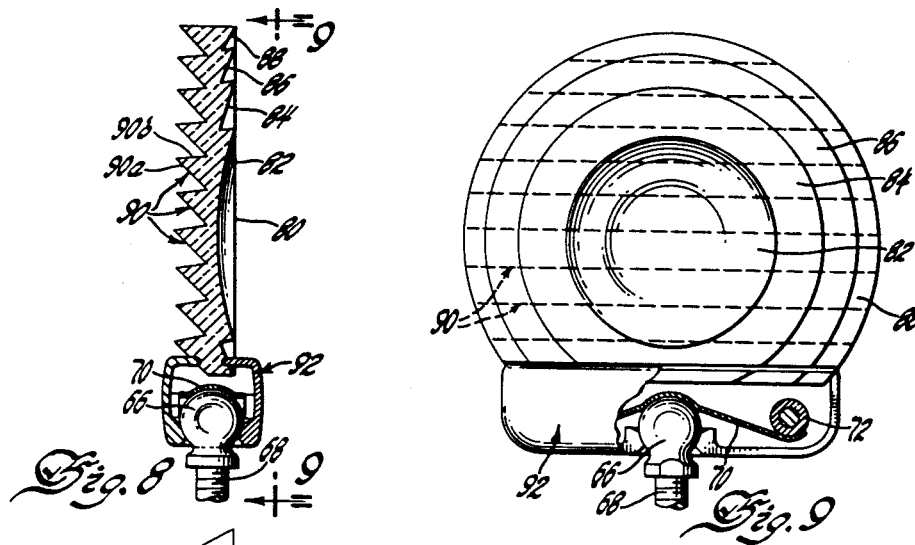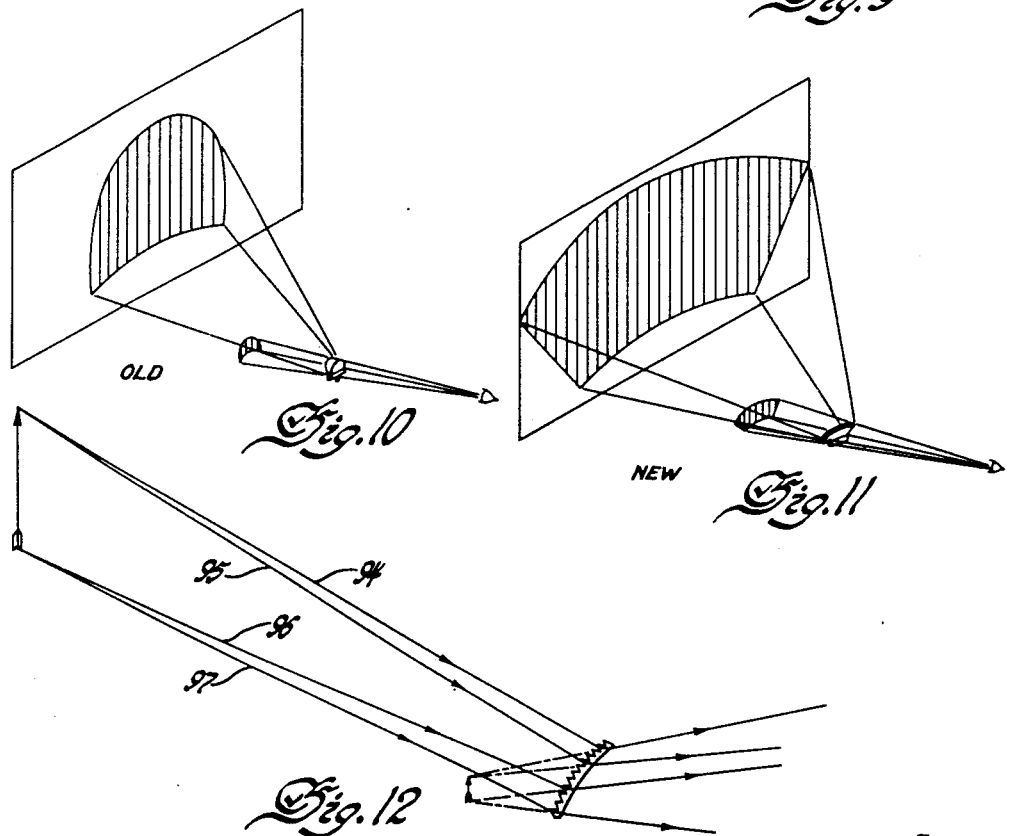

2,679,179

UNITED STATES PATENT OFFICE 2,679,179

TRAFFIC SIGNAL VIEWER

Robert N. Falge, George W. Onksen, and Grove S. Dow, Jr., Anderson, Ind., assignors to General Motors Corporation, Detroit, Mich., a corporation of Delaware Application December 7, 1950, Serial No. 199,702

10 Claims. (Cl. 88—1)

The present invention relates to optical devices and more particularly to lens devices adapted for attachment to automotive vehicles for observing traffic signal lamps.

As traffic signaling lamps are frequently disposed in overhanging positions at traffic intersections, a vehicle operator's view of the lamp may be obscured by the cab structure. To afford the operator a view of the signaling condition of such lamps at all times it is desirable to provide means within the vehicle adapted to transmit light from a lamp in such an overhanging position to the operator's eye.

Accordingly, it is an object of the present invention to provide an improved optical device for viewing traffic signaling lamps indirectly from within the cab structure of automotive vehicles.

This and other objects are attained in accordance with the present invention by providing an optical device so constructed and arranged that objects are observable through the device over a substantially large range of interception angles.

For a better understanding of the invention reference may be had to the accompanying drawings in which Figure 1 is a fragmentary view of an automotive vehicle cab structure with the optical device of the present invention mounted thereon; Figure 2 is a view taken along the line 2—2 of Figure 1; Figure 3 is a view taken on the line 3—3 of Figure 2; Figure 4 is a side elevational view of one modification of the device of the present invention; Figure 5 is a view taken on the line 5—5 of Figure 4; Figure 6 is a view taken on the line 6—6 of Figure 5; Figure 7 is a view similar to Figure 6 illustrating another modification of the device of the present invention; Figure 8 is a side elevational view of still another modification of the device of the present invention; Figure 9 is a view taken on the line 9—9 of Figure 8; Figures 10 and 11 are schematic diagrams illustrating comparative viewing areas of the device of this invention and a prior art device and Figure 12 is a view illustrating the optical diagram of the device.

Referring now to the drawings and particularly to Figures 1, 2 and 3 there is illustrated a preferred form of the optical device 2 of our invention secured by threaded members 4 to the horizontal portion 6 of the dash panel 8 which extends rearwardly of the windshield 10 of an automotive vehicle 12. The optical device 2 comprises a transparent body 14 which may be of any suitable material such as, for example, the polymerized methyl-methacrylate thermoplastic resin commonly known as "Lucite." Transparent body 14 is provided with an inner spherical surface 16 and an outer surface forming adjacent parallel prisms 18 which extend across the body and follow the spherical contour of the inner surface 16. Each of the prisms is provided with a plane surface 18a and a conical surface 18b with the angle subtended by the intersecting plane and conical surfaces of each prism increasing uniformly from the prism at the top of the body to the prism at the bottom of the body adjacent the mounting clamp 20. The prism surfaces 18a are arranged in parallel planes, and with this arrangement, the intersecting plane and conical surfaces provide a plurality of successively adjacent prisms each being substantially the segmental base edge portion of cones having a common cone axis and progressively varying cone angle.

The body 14 is positioned in a clamping device 20 comprising the complementary clamping portions 22 and 24. As illustrated in Figure 3 the clamping portion 22 is formed with inwardly extending projections 26 provided with conical recesses 28. The clamping portion 24 is formed with an aperture 30 and is provided adjacent the aperture with spherical seating surfaces 32 adapted to receive the ball head 34 of an attaching bracket 36. The clamping portion 24 is also provided with projecting conical lugs 33 which are formed with knurled surfaces 35. In assembling the viewing device of our invention the arm of the bracket member 36 is passed through a slot 38 communicating with the aperture 30 in the clamping portion 24 and the ball head 34 of the bracket is seated on the spherical surfaces 32 of the bracket portion 24. A spring 40 is then secured between the clamping portion 22 and the ball head of the bracket member 36 and at the same time the transparent body 14 is placed in position to be clamped by the edge 42 of clamping portion 22 and the edge 44 of clamping portion 24.

With the respective parts in the positions described the lugs 33 are aligned with the apertures 28 and the respective clamping portions of the clamping device 20 are pressed together to secure the body member 14 and the ball head of the bracket 36 in position. With an attaching bracket such as we have described it will be seen that universal movement of the viewing device on the bracket 36 is permitted to position the device convenient for observation by the vehicle operator.

Figures 4 and 5 illustrate a modification of our invention in which the transparent body 46 is formed with a spherical surface 48 on one side and a plurality of prisms 50 extending across the other side with the apices of the prism being aligned in a plane. In this modification the prisms 50 are formed of intersecting plane surfaces 50a and 50b with the angle subtended by the intersecting plane surfaces increasing progressively from the prism at the top of the body to the prism adjacent the mounting clamp 52.

The clamping device 52 for the transparent body 46 is substantially the same as the clamping device 20 described above. It differs in that the complementary clamping portions 54 and 56 are each provided with semi-circular openings 58 and 60 which, when the clamping portions 54 and 56 are clamped together, forms a circular aperture on the underside of the clamping device. Adjacent the edges of the circular aperture the respective clamping portions 54 and 56 are provided with spherical seating surfaces 62 and 64 which are adapted to receive the ball head 66 of an attaching screw 68. In this modification the ball head 66 of the attaching screw 68 is yieldingly urged into engagement with the spherical seating surfaces 62 and 64 by a spring 70 which is positioned within the bracket with its ends in engagement with projections 72 extending from one of the complementary bracket portions. The body 46 and ball headed attaching screw 68 are assembled in the clamping device 52 in substantially the same manner as described in connection with the viewing device of Figures 1, 2 and 3.

Figure 7 illustrates a transparent body 74 which is similar to the transparent body 46 except that the prisms 76 are provided with stepped recessed portions 78 adjacent the side edges of the body as shown.

Figures 8 and 9 illustrate still another modification of our invention in which the transparent body 80 has formed on one side thereof a stepped surface of generally spherical contour comprising a central area 82 and a plurality of concentric spherical areas 84, 86 and 88. Disposed on the other side of the body 80 is a plurality of parallel prisms 90, their apices being aligned in a common plane. As described in connection with the modifications illustrated in Figures 4, 5, 6 and 7, the prisms 90 of this modification are formed of intersecting plane surfaces 90a and 90b with the angle subtended by the intersecting plane surfaces increasing progressively from the prisms at the top of the body to the prism adjacent the mounting clamp 92. With this form of body 80 the section is maintained at substantially a minimum while retaining the desired surfaces for the viewing device. The transparent body 80 is assembled in substantially the same manner and in a bracket 92 substantially the same in form as described in connection with the modification illustrated in Figures 4, 5 and 6.

Figures 10 and 11 illustrate schematically the comparative viewing areas of a heretofore commonly used construction and the construction of the preferred modification of the present invention. With a construction such as that described in connection with the preferred modification, a wider viewing area is obtained. The gain in area is particularly noticeable at the upper portion of the lens where it is needed most.

The optical characteristics of the lens are diagrammatically illustrated in Figure 12 wherein light rays 94, 95, 96 and 97 enter the body at one of the prism surfaces, are refracted upwardly upon entering the prism surfaces to pass through the body to the spherical surface where they are again refracted upwardly at the inner or spherical surface to continue to the observer's eye. With such an arrangement of adjacent prisms, the body is positioned with respect to the observer's eye and in substantially the relationship to a vehicle as illustrated in Figure 1 to transmit to the operator a substantially uninterrupted image of the object. By such positioning the prism surfaces 18b, 50b and 90b become invisible to the observer, no light being reflected from these surfaces to the operator's eye. The only rays of light being received by the operator's eye from the object being those rays which pass through prism surfaces 18a, 50a and 90a and which are refracted in the manner described in connection with Figure 12.

With this arrangement of prisms on the transparent body having a spherical or concave inner surface there will be provided a viewing device with a substantially large interception angle, a substantially large viewing area and a substantially uninterrupted virtual, erect and diminished image of an object such as a traffic signaling light in an overhanging position on a highway.

While the embodiments of the present invention as herein described constitute preferred forms, it is to be understood that other forms might be adopted, all coming within the scope of claims which follow.

What we claim as new and desire to secure by Letters Patent of the United States is:

1. A traffic signal viewing device for automotive vehicles comprising a transparent lens body having a curved viewing surface on one side thereof and a plurality of parallel prism elements extending across the other side thereof and having apices directed away from said curved surface, the apex angles of said prism elements being progressively greater between spaced points on said lens body, and means for mounting said lens body on an automotive vehicle in a position to give a substantially uninterrupted image of objects to the front of and above the horizontal axis of the vehicle.

2. A traffic signal viewing device for automotive vehicles comprising a transparent lens body having a curved viewing surface on one side thereof and a plurality of parallel prism elements extending across the other side thereof and having apices directed away from said curved surface, the apex angles of said prism elements being progressively greater between spaced points on said lens body, and universal mounting means for attaching said lens body on an automotive vehicle to allow movement of said lens body to a position to give a substantially uninterrupted image of objects to the front of and above the horizontal axis of the vehicle.

3. A traffic signal viewing device for automotive vehicles comprising a transparent lens body having a concave viewing surface on one side thereof and a plurality of parallel prism elements extending generally horizontally across the other side thereof and having apices directed away from said concave surface, the apex angles of said prism elements being progressively greater from the top to the bottom of said lens body, and universal mounting means for attaching said lens body on an automotive vehicle to allow movement of said lens body to a position to give a substantially uninterrupted diminished image of objects to the front of and above the horizontal axis of the vehicle.

4. A traffic signal viewing device for automotive vehicles comprising a transparent lens body having a spherical viewing face on one side thereof and a plurality of parallel prism elements extending generally horizontally across the other side thereof and having apices directed away from said spherical face, each of said prism elements having a top surface and a bottom surface, the bottom surfaces all being parallel to each other and the apex angles of said prism elements being progressively greater between vertically spaced points on said lens body, and means for mounting said lens body on an automotive vehicle in a position to give a substantially uninterrupted image of objects to the front of and above the horizontal axis of the vehicle.

5. A traffic signal viewing device for automotive vehicles comprising a transparent lens body having a concave viewing face on one side thereof and a plurality of parallel prism elements extending generally horizontally across the other side thereof and having apices directed away from said concave face, each of said prism elements having a bottom plane surface and a top surface, the bottom surfaces of said prisms being parallel to each other and the top surface of each of said prisms being at an angle to a perpendicular to the bottom surface of said prism which is less than the angle of incidence and greater than the angle of refraction of a ray of light from a viewed object entering said bottom surface immediately below the apex of said prism, the apex angles of said prisms thereby being progressively greater between spaced points on said lens body, and means for mounting said lens body on an automotive vehicle in a position to give a substantially uninterrupted image of objects in front of and above the horizontal axis of the vehicle.

6. A traffic signal viewing device for automotive vehicles comprising a transparent lens body having a concave viewing surface on one side thereof and a plurality of parallel prism elements extending across the other side thereof and having apices directed away from said concave surface, the apex angles of said prism elements being progressively greater between spaced points on said lens body, and means for mounting said lens body, said means including complementary clamping portions having complementary attaching means for clamping said body therebetween and said clamping portions together and a universal joint for attaching said device to an automotive vehicle for positioning of said lens body to provide a substantially uninterrupted diminished image of objects in front of and above the horizontal axis of the vehicle.

7. A traffic signal viewing device for automotive vehicles comprising a transparent lens body having a spherical viewing surface on one side thereof and a plurality of arcuate parallel prism elements extending across the other side thereof and having apices directed away from said spherical surface and following the contour thereof, the apex angles of said prism elements being progressively greater between spaced points on said lens body, and means for mounting said lens body on an automotive vehicle in a position to give a substantially uninterrupted image of objects to the front of and above the horizontal axis of the vehicle.

8. A traffic signal viewing device for automotive vehicles comprising a transparent lens body having a spherical concave viewing face on one side thereof and a plurality of arcuate parallel prism elements extending across the other side thereof and having apices directed away from said spherical concave face and following the contour thereof, one of the surfaces of each of said prism elements being conical and the other of the surfaces of each of said prism elements being planar, all of the planar surfaces being parallel to each other and the apex angles of said prism elements being progressively greater between spaced points on said lens body, and means for mounting said lens body on an automotive vehicle in a position to give a substantially uninterrupted diminished erect and virtual image of objects to the front of and above the horizontal axis of the vehicle.

9. A traffic signal viewing device for automotive vehicles comprising a transparent lens body having a spherical concave viewing surface on one side thereof and a plurality of parallel prism elements extending across the other side thereof and having apices directed away from said spherical concave surface and aligned in a common plane, the apex angles of said prism elements being progressively greater between spaced points on said lens body, and means for mounting said lens body on an automotive vehicle in a position to give a substantially uninterrupted image of objects to the front of and above the horizontal axis of the vehicle.

10. A traffic signal viewing device for automotive vehicles comprising a transparent lens body having a spherical concave viewing surface on one side thereof and a plurality of parallel prism elements with stepped recessed edge portions extending across the other side thereof and having apices directed away from said spherical concave surface, the apex angles of said prism elements being progressively greater between spaced points on said lens body, and means for mounting said lens body on an automotive vehicle in a position to give a substantially uninterrupted image of objects to the front of and above the horizontal axis of the vehicle.

References Cited in the file of this patent

UNITED STATES PATENTS

| Number | Name | Date |
|---|---|---|
| 563,836 | Blondel et al. | July 14, 1896 |
| 1,791,936 | Rolph | Feb. 10, 1931 |
| 1,872,501 | Rehlander | Aug. 16, 1932 |
| 1,933,333 | Morgan | Oct. 31, 1933 |
| 2,114,767 | Hodny et al. | Apr. 19, 1938 |
| 2,200,646 | Strong et al. | May 14, 1940 |
| 2,469,207 | Roedding | May 3, 1949 |

FOREIGN PATENTS

| Number | Country | Date |
|---|---|---|
| 4,141 | Great Britain | Feb. 16, 1897 |
| 520,195 | Germany | Mar. 9, 1931 |
| 790,905 | France | Sept. 16, 1935 |